Dec. 13, 1938.  G. W. CARLSON ET AL  2,140,379
VEHICLE BRAKE
Filed Nov. 27, 1936
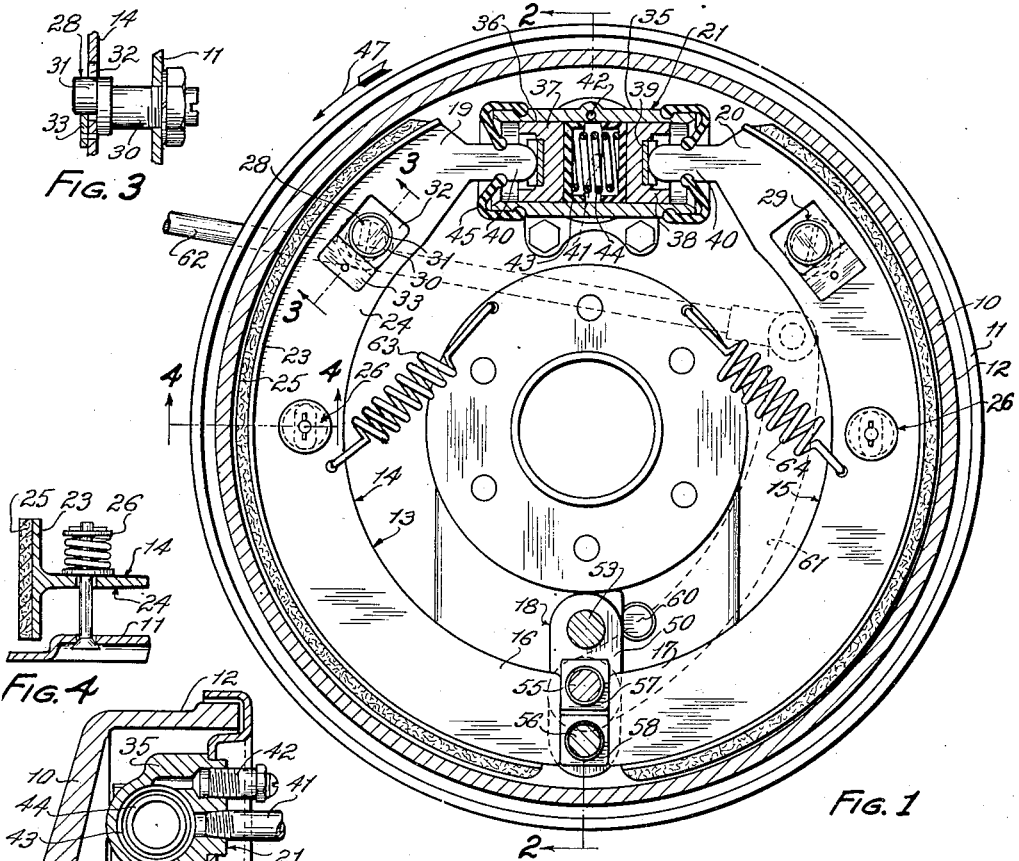
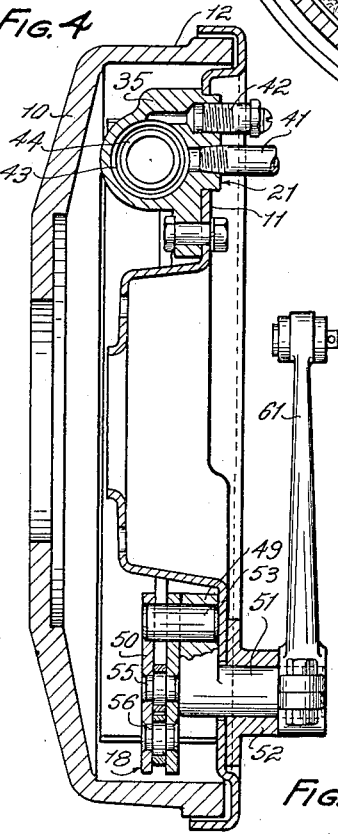
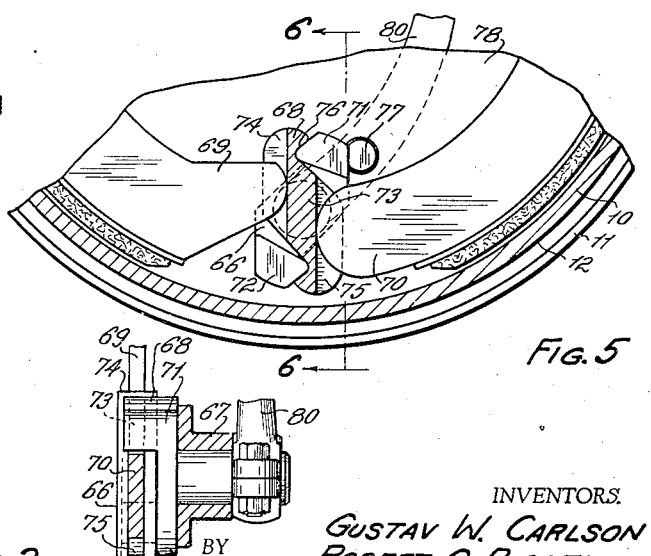
INVENTORS.
GUSTAV W. CARLSON
ROBERT C. RUSSELL
BY Kwis, Hudson & Kent
ATTORNEYS.

Patented Dec. 13, 1938

2,140,379

UNITED STATES PATENT OFFICE 2,140,379

VEHICLE BRAKE

Gustav W. Carlson, Cleveland Heights, and Robert C. Russell, Shaker Heights, Ohio, assignors to Eaton Manufacturing Company, Cleveland, Ohio, a corporation of Ohio Application November 27, 1936, Serial No. 113,016

4 Claims. (Cl. 188—106)

This invention relates to vehicle brakes and more particularly to an improved brake of the internal expanding self-energizing type.

An object of our invention is to provide an improved self-energizing brake having a plurality of brake shoes and novel means for actuating the same.

Another object of our invention is to provide an improved brake of the type mentioned having novel means operable to substantially equalize the braking action between a plurality of shoes.

Still another object of our invention is to provide an improved brake having a pair of shoes between which the braking action is substantially equalized and a single pressure fluid responsive device adapted to act on both shoes to apply the same substantially simultaneously.

A further object of our invention is to provide an improved vehicle brake having a pair of brake shoes and means for actuating the shoes including a device operable to apply the shoes and another device for substantial equalization of the braking action between the shoes, and wherein driver-controlled auxiliary means is adapted to act through the equalizing device to apply the shoes.

Other objects and advantages of our invention will be apparent from the following description when taken in conjunction with the accompanying sheet of drawings, in which, Fig. 1 is a sectional view taken through a vehicle brake embodying our invention and showing the friction device thereof in elevation.

Fig. 2 is a transverse sectional view taken through the brake as indicated by line 2—2 of Fig. 1.

Fig. 3 is a partial sectional view taken through one of the anchors as indicated by line 3—3 of Fig. 1.

Fig. 4 is a similar partial sectional view of a shoe aligning device taken on line 4—4 of Fig. 1.

Fig. 5 is a partial sectional view illustrating another form of equalizing device which may be embodied in our brake, and Fig. 6 is a partial transverse sectional view taken on line 6—6 of Fig. 5.

In the accompanying drawing, to which more detailed reference will presently be made, we have shown one embodiment of our improved self-energizing brake, but it should be understood that this is by way of example only and that the invention may be embodied in various other designs and constructions.

The brake illustrated in this instance includes the usual rotatable brake drum 10 and a support or backing plate 11 adjacent thereto. The drum has an annular flange 12 with which a friction device 13 cooperates. The friction device may comprise a pair of arcuately extending shoes 14 and 15 disposed within the drum for braking cooperation with the inner surface of the annular drum flange. The shoes are arranged in the drum so that one pair of adjacent ends 16 and 17 may cooperate with an equalizing device 18 and the other pair of adjacent ends 19 and 20 may cooperate with a brake applying or actuator device 21.

The shoes themselves may be of any suitable construction, for example each shoe may have flange and web portions 23 and 24 and may be of substantially T-shaped cross section in which the flange portion 23 forms the top of the T-section and the web portion 24 forms the stem of the T-section. Each shoe may have a section of suitable brake lining 25 secured to the flange portion 23 thereof for frictional cooperation with the inner surface of the annular drum flange 12. The shoes are loosely supported adjacent the drum surface so as to have limited circumferential shifting and are centered with respect to the drum surface by means of the aligning devices 26.

Anchors 28 and 29 are provided for the shoes for limiting circumferential shifting of the friction device during the braking action, the anchor 28 cooperating with shoe 14 and anchor 29 cooperating with shoe 15. These anchors may be in the form of a bolt-like member 30 carried on the backing plate and having an eccentric pin extension 31 projecting into an opening 32 of the web portion of the shoe. The openings 32 are preferably located adjacent the ends 19 and 20 of the shoes and each opening may have an L-shaped bearing member 33 therein with which the eccentric pin portion 31 engages.

The actuating device 21 acts on the shoe ends 19 and 20 in a direction to separate the same and press the linings 25 thereof into frictional engagement with the drum surface. This actuating device may comprise a housing 35 mounted on the backing plate 11 between the opposing shoe ends 19 and 20 and may have a fluid pressure cylinder 36 formed therein. A pair of opposed pistons 37 and 38 may be slidably mounted in the cylinder and carry bearing plates 39 which are engaged by cam-like extensions 40 of the shoe ends 19 and 20 extending into the outer ends of the cylinder.

Pressure fluid may be supplied to the section of the cylinder which is included between the pistons by means of a tube or pipe 41 leading from a suitable pressure creating device adapted to be operated by a pedal, lever or other driver-controlled member. Air which collects in the cylinder may be released therefrom through the fitting 42. Leakage of pressure fluid past the pistons may be prevented by suitable packing in the form of flexible cup-shaped members 43 which are pressed against the adjacent ends of the pistons by means of a compression spring 44. Entry of dirt and other foreign matter at the outer ends of the cylinder may be prevented by flexible sealing covers 45 which embrace the cylinder ends and through which the shoe extensions 40 project.

When the brake is to be applied, pressure fluid is forced into the cylinder between the pistons thereof and causes separating movement of the shoe ends 19 and 20. This causes the brake lining to be frictionally pressed against the surface of the drum flange 12 and, when the drum is rotating in an ahead direction as indicated by the arrow 47, there is a tendency for the drum to carry the shoes 14 and 15 along with it in a counter-clockwise direction. This tendency for the drum to carry the shoes along with it produces a self-energizing action which increases the braking force. During ahead braking, motion is transmitted from the shoe 14 to the shoe 15 through the equalizing device 18 and the braking reaction is taken in part by the equalizing device and in part by the anchor 29. During reverse braking there is a tendency for the shoes 14 and 15 to be carried along with the drum in a clockwise direction when they are pressed thereagainst by the actuator device and the reaction from the resulting braking function is taken against the anchor 28.

By means of the equalizing device 18, motion may be transmited from the shoe 14 to the shoe 15 in such a manner that the ahead braking action is substantially equalized between the two shoes. This results in more uniform wear of the brake linings and in other important advantages being obtained. This equalizing device, as shown in Figs. 1 and 2, may comprise a member 49 pivoted on the backing plate 11 and a link or lever 50 cooperating with the adjacent shoe ends 16 and 17. The member 49 may have a shaft portion 51 journaled in a bearing 52 which is mounted on the backing plate so as to bring the pivot axis of the shaft portion substantially on a radial line of the drum passing midway between the shoe ends 16 and 17. The link 50 is carried by the member 49 and as shown in Figs. 1 and 2 may be pivotally connected to this member at a point offset from the pivot axis of the shaft portion 51, as by means of the pivot pin 53. This link may be formed by plates connected in spaced relation to provide a recess into which the web portions of the shoes 14 and 15 extend. Pins or rivets 55 and 56 extending through the plates of the link cooperate with the shoe ends through bearing blocks 57 and 58 which are carried by these pins and pivoted thereon. It will be noted, however, that the bearing blocks 57 and 58 engage the shoe ends at different lever arm distances from the axis of the pivot pin 53 and the center of the brake drum.

A stop, preferably in the form of a pin 60, is provided on the backing plate to be engaged by the member 49 so as to limit swinging of this member in a clockwise direction on the shaft portion 51. When motion is transmitted from the shoe 14 to the shoe 15 the member 49 engages the stop 60 after which the link 50 swings on the pivot pin 53 to produce a wedging or spreading action on the adjacent shoe ends and because of the different lever arm distances mentioned, only about fifty percent of the force delivered to the link 50 is transmitted to the shoe 15, the other fifty percent being expended against the pivot pin 53 and the stop 60. At the beginning of this action both of the blocks 57 and 58 are engaged by the end of the shoe 14, but after the initial swinging of the link 50 from its position in Fig. 1, the shoe 14 acts only on the block 57 and the shoe 15 is acted upon only by the block 58. The result of this action is that the shoe 15 is pressed against the brake drum with substantially the same force as the shoe 14 and the braking action is substantially equalized between the two shoes.

During reverse braking motion is transmitted from the shoe 15 to the shoe 14 but since the member 49 can swing away from the stop 60 and the link 50 can swing on the pivot pin 53, there is no equalizing function accomplished and the entire braking reaction is taken against the anchor 28.

The actuating device 21 is intended to be regularly used in applying the brake and therefore may be conveniently termed the service actuator. It is desirable however to provide, in addition, an auxiliary or emergency actuating means. We find that this auxiliary or emergency actuating means may be conveniently arranged to act through the equalizing device 18 and for this purpose we provide a lever 61 which is keyed or otherwise connected to the outer end of the shaft portion 51 of the member 49. Motion may be transmitted to the lever 61 by means of a connecting rod 62 extending from a hand lever or other driver-controlled member. The pulling force applied to the rod 62 swings the lever 61 and the member 49 in a counter-clockwise direction and the swinging movement thereby imparted to the link or lever 50 causes the bearing blocks 57 and 58 to wedge the shoes 14 and 15 apart and against the drum surface.

When the actuating force applied through the device 21 or through the rod 62 is removed the shoes 14 and 15 are swung toward each other to a released position in engagement with the anchors 28 and 29. For this purpose we provide suitable tension springs 63 and 64 which act, respectively, on the shoes 14 and 15. The spring 63 is preferably somewhat weaker than the spring 64 so that during ahead braking the shoe 14 will be pressed against the drum surface slightly in advance of the shoe 15.

In Figs. 5 and 6 of the drawing we have shown another form of equalizing device which may be used between the shoes and which will operate to equalize the braking force between the two shoes during reverse braking as well as during ahead braking. This equalizing device comprises a member 66 pivotally supported on the backing plate by a bearing bracket 67 and a link 68 cooperating with the circumferentially aligned radially offset shoe ends 69 and 70. The member 66 is formed with laterally extending lugs 71 and 72 which are offset from the axis of the bearing bracket 67. The link 68 has slots in opposed sides thereof into which the shoe ends 69 and 70 extend for engagement with opposite faces of the bearing portion 73. The body of the link is disposed between the lugs 71 and 72 and the finger-like projections 74 and 75 of the link extend outwardly and engage opposite faces of the lugs 71 and 72. These faces of the lugs are preferably rounded and engage in recesses 76 of the link projections. The link 68 is not secured to the member 66 but is in rockable relation thereto so that one of the fingers of the link may fulcrum on one of the lugs while the other finger is capable of shifting away from the other lug.

In the operation of this equalizing device motion transmitted from the shoe end 69 to the shoe end 70 causes the link 68 to shift relative to the member 66, the latter remaining stationary with the lug 71 thereof engaging a stop 77 projecting from the backing plate 78. During this action the link 68 fulcrums on the lug 71 and the link end or finger 75 shifts away from the lug 72. It will be noted that the shoe ends 69 and 70 engage the link 68 at different lever arm distances from the lug 71 which is now serving as a fulcrum, and hence only a portion, for example fifty percent of the force delivered by the shoe end 69 is transmitted to the shoe end 70. During reverse braking, motion transmitted from the shoe end 70 to shoe end 69 causes the link end or finger 74 to shift away from the lug 71 while the link end 75 fulcrums on the lug 72. In this case the shoe ends also engage the link at different lever arm distances from the fulcrum 72 such that the force transmitted to the shoe end 69 is approximately only fifty percent of the force delivered by the shoe end 70.

If desired an emergency or auxiliary brake applying means may be provided to act through this equalizing device. For this purpose we provide the pivoted member 66 with a lever 80 which may be operably connected with a hand lever or other driver-controlled member. Swinging of the lever 80 in a counter-clockwise direction causes corresponding rotary movement of the member 66 and the link 68 and this rotary movement causes the shoe ends 69 and 70 to be wedged apart to thereby press the brake shoes against the drum surface. By reason of the construction and arrangement of the equalizing device it will be seen that the braking action will be substantially equalized between the two shoes during ahead and reverse emergency braking as well as service braking, because if the braking torque of one shoe exceeds that of the other shoe it will cause the link 68 to rock on the member 66 and will thereby increase the brake applying force supplied to the other shoe.

From the foregoing description and the accompanying drawing it will now be readily seen that we have provided a self-energizing brake of very simple form which has highly satisfactory operating characteristics. In this improved brake only one pressure fluid responsive device is needed to apply the two shoes of the friction device because our equalizing device acts to substantially equalize the braking function between the shoes. It will also be seen that in our improved brake an auxiliary or emergency connection can be employed and can be readily made to act on the shoes through the equalizing device.

While we have illustrated and described our improved brake in a somewhat detailed manner, it should be understood that we do not wish to be limited to the precise details of construction and arrangements of parts illustrated and described, but regard our invention as including such changes or modifications as do not constitute a departure from the spirit of the invention and the scope of the appended claims.

Having thus described our invention, we claim:

1. In a brake, the combination of a rotatable drum, a pair of shoes adapted for braking cooperation with the drum and having pairs of opposed ends, a service actuating means cooperating with one pair of said ends to apply the shoes, means cooperating with the other pair of said ends to substantially equalize the braking action between the shoes when applied by said service means, and auxiliary means adapted to act through said equalizing means for applying the shoes, said equalizing means being also adapted to substantially equalize the braking action between the shoes when they are applied by said auxiliary means.

2. In a brake, the combination of a rotatable drum, a pair of shoes adapted for braking cooperation with the drum, means cooperating with the shoes adjacent one pair of ends thereof for applying the brake, a pivoted member with which the other ends of said shoes cooperate at different lever arm distances, said pivoted member being operable to substantially equalize the braking action between the shoes when they are applied by said means, and means for actuating said pivoted member to thereby apply the shoes independently of the first-named means.

3. In combination, a rotatable drum, a support adjacent said drum, a pair of shoes adapted for braking cooperation with said drum and having their ends in opposed paired relation, a service actuator adapted to cooperate with one pair of said ends for applying the shoes for both ahead and reverse braking, means cooperating with the other pair of ends and operable to substantially equalize the braking action between the two shoes during both ahead and reverse braking, and emergency operating means adapted to act through said equalizing means for applying the shoes.

4. In combination, a rotatable drum, a support adjacent said drum, a pair of shoes adapted for braking cooperation with said drum and having their ends in opposed paired relation, a service actuator adapted to cooperate with one pair of said ends for applying the shoes for both ahead and reverse braking, a member pivoted on said support adjacent the other pair of said ends and having a pair of projections extending in the direction of its pivot axis but offset therefrom, said other pair of ends being also offset from said pivot axis but a shorter distance than said projections, a part disposed to be engaged on opposite sides thereof by said offset ends and extending transversely of the pivot axis between said projections, a stop on said support adapted to be engaged by said member for limiting rotation thereof in one direction, said part being shiftable relative to said member after engagement of the latter with said stop and adapted to fulcrum on one of said projections during ahead braking and to fulcrum on the other projection during reverse braking, and emergency operating means for imparting rotation to said member.

GUSTAV W. CARLSON.
ROBERT C. RUSSELL.